US008751174B2

(12) United States Patent
Koehler et al.

(10) Patent No.: US 8,751,174 B2
(45) Date of Patent: Jun. 10, 2014

(54) METHOD FOR DETERMINING THE SIZE OF A LEAK

(75) Inventors: Armin Koehler, Ingolstadt (DE); Ludger Hoelscher, Luedenscheid (DE); Uwe Finis, Neuenrade (DE)

(73) Assignee: Audi AG, Ingolstadt (DE)

( * ) Notice: Subject to any disclaimer, the term of this patent is extended or adjusted under 35 U.S.C. 154(b) by 830 days.

(21) Appl. No.: 12/531,159

(22) PCT Filed: Mar. 14, 2008

(86) PCT No.: PCT/EP2008/002071
§ 371 (c)(1), (2), (4) Date: Jan. 14, 2010

(87) PCT Pub. No.: WO2008/110381
PCT Pub. Date: Sep. 18, 2008

(65) Prior Publication Data

US 2011/0307195 A1 Dec. 15, 2011

(30) Foreign Application Priority Data

Mar. 14, 2007 (DE) ........................ 10 2007 012 200

(51) Int. Cl.
*G06F 19/00* (2011.01)
*G01M 3/04* (2006.01)

(52) U.S. Cl.
USPC .............................................. 702/51; 73/49.2

(58) Field of Classification Search
USPC .................................... 702/51; 73/49.2, 49.7
See application file for complete search history.

(56) References Cited

U.S. PATENT DOCUMENTS

| | | | | |
|---|---|---|---|---|
| 4,350,492 | A * | 9/1982 | Wright et al. | 8/94.11 |
| 5,002,464 | A * | 3/1991 | Lee | 417/152 |
| 5,680,849 | A | 10/1997 | Morikawa et al. | |
| 6,082,337 | A * | 7/2000 | Fujimoto et al. | 123/520 |
| 6,269,803 | B1 | 8/2001 | Corkill | |
| 6,909,839 | B2 * | 6/2005 | Wang et al. | 392/389 |
| 2009/0099795 | A1 * | 4/2009 | Behar et al. | 702/51 |

FOREIGN PATENT DOCUMENTS

| | | | |
|---|---|---|---|
| DE | 4342431 | A1 | 6/1995 |
| DE | 19755401 | A1 | 7/1998 |
| DE | 19713085 | A1 | 10/1998 |
| DE | 10143329 | A1 | 4/2003 |
| DE | 10328364 | A1 | 2/2004 |
| EP | 1122422 | A2 | 8/2001 |

* cited by examiner

*Primary Examiner* — Michael Nghiem
*Assistant Examiner* — Alexander Satanovsky
(74) *Attorney, Agent, or Firm* — Novak Druce Connolly Bove + Quigg LLP

(57) ABSTRACT

A method for determining the size of a leak in the liquid-containing tank device of a vehicle, in particular of a motor vehicle, the liquid influencing the pressure in the tank device by evaporation, with the following steps: generating a first pressure as a reference pressure in the tank device at a first instant, detecting a first pressure characteristic up to a second instant, generating a second pressure at a third instant, the first pressure and the second pressure being chosen to be different, detecting a second pressure characteristic up to the fourth instant, determining the pressure gradient of the first pressure characteristic at the second instant and of the pressure gradient of the second pressure characteristic at the third instant, determining the first pressure difference of the pressure at the second instant from the reference pressure, determining the second pressure difference of the pressure at the third instant from the reference pressure, computing the size of the leak depending on the determined pressure gradient and the pressure differences, and the assumption that the evaporation rate is constant in the tank device, and that a leak rate is established which is proportional to the square root of the respective pressure difference.

16 Claims, 1 Drawing Sheet

METHOD FOR DETERMINING THE SIZE OF A LEAK

The invention relates to a method for determining the size of a leak in the liquid-containing tank device of a vehicle, in particular of a motor vehicle, the liquid influencing the pressure in the tank device by evaporation.

BACKGROUND OF THE INVENTION

Methods for detecting and determining a leak in a tank device are disclosed in the prior art. Thus, for example, DE 102 54 986 A1 discloses a method for tank leak diagnosis in a tank ventilation device in which the pressure increase in the tank ventilation device is computed based on the outgassing or evaporating fuel by means of the mass balance and is also considered in the determination of a leak, for tank leak diagnosis the tank ventilation device being "evacuated," so that a negative pressure is formed.

Current methods for detecting or determining a leak while the engine is running, i.e., during operation of an internal combustion engine which has a tank device, due to physical boundary conditions are not able to reliably detect a leak of 0.5 mm. In these cases a downstream diagnosis is necessary after "engine-off", that is, with the internal combustion engine turned off, which is more sensitive than required and leads to a high closed-circuit current load in the vehicle.

It is therefore the object of the invention to reliably detect a leak of up to 0.5 mm in size, the size of the leak being defined by the diameter (for example, d=0.5 mm).

SUMMARY OF THE INVENTION

The object of the invention is achieved by a method with the following steps:

First, in the tank device at a first instant, a first pressure is produced which is used for the further method as a reference pressure. Then, up to a second instant, a first pressure characteristic which arises by the evaporation of the liquid contained in the tank device is detected. Then a second pressure is set at a third instant, the second pressure differing from the first pressure. The generation of the first or second pressure at the first or third instant should be understood in such a way that at the respective instant (the first or third) the generated first or second pressure prevails in the tank device. Then a second pressure characteristic is detected from the third instant to the fourth instant. In this case, the pressure characteristic which occurs describes the pressure change in the tank device as a result of the evaporation of the liquid contained in the tank device. After detecting the first and second pressure characteristic, the pressure gradient of the first pressure characteristic at the second instant and the pressure gradient of the second pressure characteristic at the third instant are determined. Furthermore, a first pressure difference of the pressure prevailing in the tank device at the second instant and at the third instant from the reference pressure is determined. Depending on the determined pressure gradient and pressure differences, and the assumption that the evaporation rate in the tank device is constant, and that a leak rate is established which is proportional to the square root of the respective pressure difference, finally the size of the leak is determined. Based on the assumption that the evaporation rate in the tank device at each instant is constant, the size of the leak can be easily determined with the aforementioned values by means of the following formula:

$$A=\left(\frac{V}{p*\alpha}*\sqrt{\frac{\rho}{2*R*T}}\right)*\frac{1}{\sqrt{\Delta p_4}}*\left\{\frac{\{(dp/dt)_4-(dp/dt)_2\}}{\left(1+\sqrt{\frac{\Delta p_2}{\Delta p_4}}\right)}\right\}$$

Here the pressure gradient of the second pressure characteristic ($(dp/dt)_5$) therefore is set into a relation to the pressure gradient of the first pressure characteristic ($(dp/dt)_2$) and standardized to the pressure difference at the second instant ($\Delta p_2$) and the third instant ($\Delta p_5$). The constants are the volume (V) of the tank device, the flow characteristic (a) which designates the leak as an orifice plate, the density of the gas (p) located in the tank device as well as the temperature of the gas (T). The basis for this formula is the assumption according to the orifice plate formula that a leak rate is established which is proportional to the square root from the respective pressure difference:

$$\frac{\dot{V}_{1L}}{\dot{V}_{2L}}=\frac{\sqrt{\Delta p_1}}{\sqrt{\Delta p_2}}$$

The subscripts 1 and 2 stand for the first phase (from the first instant to the second instant) and the second phase (from the third instant to the fourth instant) of the method according to the invention, respectively. The respective leak rate ($V_{1L}$, $V_{2L}$) corresponds to the volumetric flow which flows through the leak that is understood as an orifice plate.

Advantageously, the ambient pressure is generated as the first pressure in the tank device, that is, a (gas) pressure which corresponds to the ambient pressure of the tank device. Proceeding from this pressure then, the first pressure characteristic, which is formed as a result of the evaporation or outgassing of the liquid, is detected.

Advantageously, a negative pressure is produced as the second pressure. Preferably the negative pressure is down to −16 mbar. In this way, the second pressure characteristic which occurs is detected at a pressure level other than the first pressure characteristic, and, as a result of the different pressure level, a more accurate conclusion about the leak can be drawn.

Advantageously, the first pressure is produced by opening a ventilation valve of the tank device. The ventilation valve therefore enables pressure equalization between the tank device and the exterior by opening. The valve advantageously remains open until the ambient pressure has been established in the tank device. The first instant thus corresponds to the instant at which the valve is closed and the pressure in the tank device is changed as a result of the evaporation of the liquid.

According to one development of the invention, the second pressure is produced by opening of a regeneration valve which produces a connection to the intake manifold of an internal combustion engine which has a tank device. Thus there is a regeneration valve on the tank device which establishes a connection from the tank device to the intake manifold of the internal combustion engine in the opened state. During operation, suction is thus produced which leads to a negative pressure in the tank device. The regeneration valve according to the invention is closed at a third instant, after which the pressure in the tank device changes solely as a result of the leak and the evaporation of the liquid.

Advantageously, the second and/or the fourth instant is chosen such that the pressure gradient determined at the time adequately describes the pressure characteristic in the respective phase of the method so that an accurate conclusion about the size of the leak is possible.

DETAILED DESCRIPTION OF THE PREFERRED EMBODIMENT OF THE INVENTION

Figure 1A:
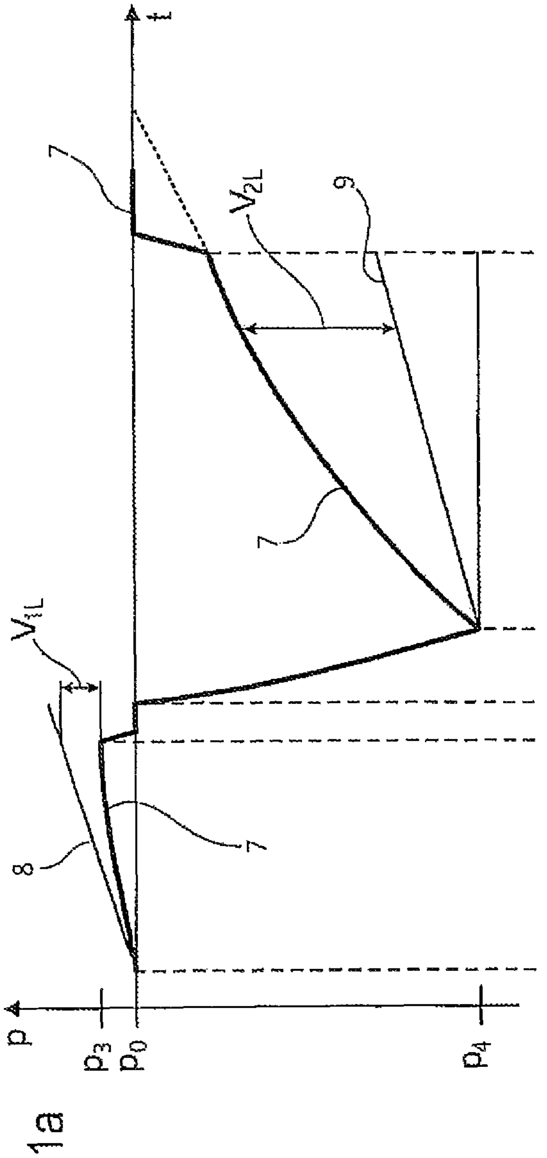
FIGS. 1*a* and *b* schematically show the method according to the invention.
Figure 1B:
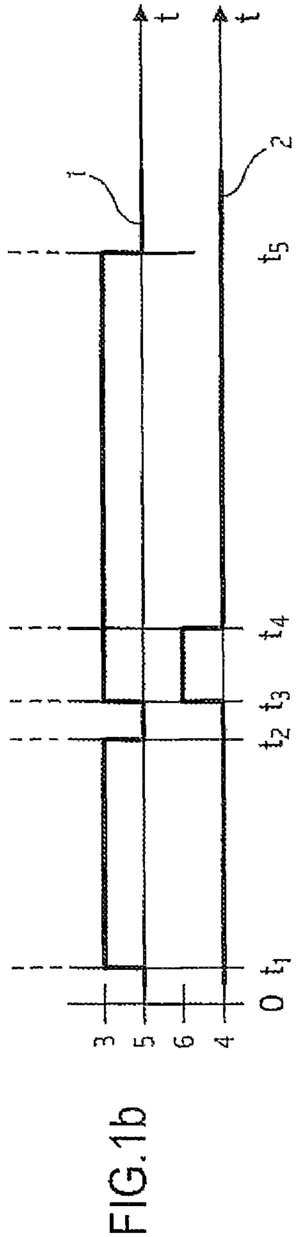

FIGS. 1*a* and *b* describe one embodiment of the method according to the invention. For this purpose FIG. 1*a* shows a diagram in which the pressure p prevailing in the tank device is plotted over the time t in seconds. FIG. 1*b* shows the operating states of the ventilation valve 1 and of the regeneration valve 2 of the tank device, the ventilation valve 1 or the regeneration valve 2 being closed in the first state 3 or 4 and being open in the second state 5 or 6. The operating states 3, 4, 5, 6 are likewise plotted over the time t.

The curve 7 shown bold-faced in FIG. 1*a* identifies the measured pressure characteristic in the tank device. At a first instant $t_1$, the ventilation valve 1 is closed so that the pressure prevailing in the tank device is influenced only by the evaporation or outgassing of the liquid located in the tank device and a leak in the tank device. Evaporation or outgassing in this context is defined as a volumetric flow or as an evaporation rate. Likewise, the gas which is flowing out through the leak is defined as a volumetric flow or leak rate, the leak being defined as an orifice plate. At instant $t_1$, the pressure in the tank device is equal to the ambient pressure $p_0$. This established first pressure $p_1$ is used as a reference pressure for the further method. Starting from instant $t_1$, the pressure p in the tank device rises according to the evaporation and the size of the leak or according to the evaporation rate and the leak rate, and its rising less with increasing time as a result of the equilibrium which is being established between the tank interior and the exterior. The curve 8 which proceeds from instant $t_1$ shows the theoretical pressure rise for the case in which there is no leak in the tank device. At instant $t_2$ the ventilation valve 1 is opened and again the ambient pressure $p_0$ is established again in the tank device. At the following instant $t_3$ the regeneration valve 2 is opened so that a connection is established to the intake manifold of the internal combustion engine which has the tank device so that suction arises and in the tank device a negative pressure $p_4$ is produced, the negative pressure $p_4$ corresponding to the pressure which prevails when the regeneration valve 2 is closed at instant $t_4$. Starting from this instant, the pressure p in the tank device rises again due to the evaporation rate and the leak rate. Due to the negative pressure, ambient air flows into the tank so that the pressure rise which threatens only the evaporation would be smaller, as shown by curve 9. At instant $t_5$, the ventilation valve 1 is opened again and pressure equalization takes place so that the ambient pressure $p_0$ prevails in the tank device.

The size of the leak is now determined as follows:

First, according to the orifice plate formula, it holds that a leak rate is established which is proportional to the square root of the respective pressure difference. Instants $t_2$ and $t_4$ are examined in this respect, its holding according to the orifice plate formula that the ratio of the leak rates at instant $t_2$ and instant $t_4$ corresponds to the ratio of the root of the pressure difference at instant $t_2$ to the square root of the pressure difference at instant $t_4$:

$$\frac{\dot{V}_{12}}{\dot{V}_{4L}} = \frac{\sqrt{\Delta p_2}}{\sqrt{\Delta p_4}}$$

The pressure $p_2$ or $p_4$ prevailing in the tank device at instant $t_2$ or $t_4$, respectively, for the initial pressure $p_0$ which corresponds to the ambient pressure is determined as the pressure difference.

Assuming a constant evaporation rate V we find:

$$\dot{V}_{2D} = \dot{V}_{4D}$$

the total volumetric flow $V_G$ in the first phase ($t_1$ to $t_2$) resulting from the evaporation rate from $V_{D2}$ minus the leak rate $V_{L2}$. In the second phase ($t_4$ to $t_5$) the total volumetric flow $V_{G4}$ results from the sum of the evaporation rate and the leak rate. This leads to the following:

$$\dot{V}_{2G} + \dot{V}_{2L} = \dot{V}_{4G} - \dot{V}_{4L}$$

Then the leak rate $V_{4L}$ in the second phase, i.e., from instant $t_4$ to $t_5$, is determined from the following formula, its resulting from the preceding equations:

$$\dot{V}_{4L} = \frac{\dot{V}_{4G} - \dot{V}_{2G}}{1 + \frac{\sqrt{\Delta p_2}}{\sqrt{\Delta p_4}}}$$

Since the measured pressures and the volumetric flows to be determined are directly related, to determine the leakage in the second phase V $\mathbf{4}_L$, the volumetric flow can be replaced by the pressure gradient:

$$\Delta p_{4L} = \frac{\Delta p_{4G} - \Delta p_{2G}}{\left(1 + \sqrt{\frac{\Delta p_2}{\Delta p_4}}\right)}$$

Thus, the cross sectional area of the leak is computed based on the volumetric flow through an orifice plate with the aforementioned leak rate as follows:

$$V = \alpha * A * \sqrt{\frac{2 * R * T}{\rho}} * \sqrt{\Delta p}$$

Accordingly, a stands for the flow characteristic of the leak understood as an orifice plate, A stands for the cross sectional area of the leak, R for the universal gas constant, T for temperature and p for the density of the inflowing or outflowing gas. This formula yields the following:

$$A = \left(\frac{V}{p * \alpha} * \sqrt{\frac{\rho}{2 * R * T}}\right) * \frac{dp/dt}{\sqrt{\Delta p}}$$

for purposes of simplification the term in parentheses being summarized:

$$A = (\text{Term}) * \frac{dp/dt}{\sqrt{\Delta p}}$$

This yields the following for the cross sectional area and thus for the size of the leak:

$$A = (\text{Term}) * \frac{1}{\sqrt{\Delta p_4}} * \left\{ \frac{\{(dp/dt)_4 - (dp/dt)_2\}}{\left(1 + \sqrt{\frac{\Delta p_2}{\Delta p_4}}\right)} \right\}$$

By means of this advantageous method leaks with a diameter starting from 0.5 mm can be determined. The prerequisite for this is the assumption that during the overpressure phase ($t_1$ to $t_2$) and the negative pressure phase ($t_4$ to $t_5$) a constant evaporation rate ($V_D$) is present.

The invention claimed is:

1. A method for determining the cross sectional area of a leak in the liquid-containing tank device of a vehicle, in particular of a motor vehicle, the liquid influencing the pressure in the tank device by evaporation, with the following steps:

generating a first pressure as a reference pressure in the tank device at a first instant ($t_1$), detecting a first pressure characteristic up to a second instant ($t_2$), generating a second pressure at a third instant ($t_4$), the first pressure and the second pressure being chosen to be different, detecting a second pressure characteristic up to the fourth instant ($t_5$), determining the pressure gradient of the first pressure characteristic at the second instant ($t_2$) and of the pressure gradient of the second pressure characteristic at the third instant ($t_4$), determining the first pressure difference of the pressure at the second instant ($t_2$) from the reference pressure, determining the second pressure difference of the pressure at the third instant ($t_4$) from the reference pressure, computing the cross sectional area of the leak depending on the determined pressure gradient and the pressure differences, based on an equation:

$$A = \left(\frac{V}{p * \alpha} * \sqrt{\frac{\rho}{2 * R * T}}\right) * \frac{1}{\sqrt{\Delta p_4}} * \left\{ \frac{\{(dp/dt)_4 - (dp/dt)_2\}}{\left(1 + \sqrt{\frac{\Delta p_2}{\Delta p_4}}\right)} \right\},$$

wherein

A is the cross sectional area of the leak,

V is the volume of the tank device, p is the density of a gas flowing through the leak, α is a flow characteristic that designates the leak as an orifice plate, R is the universal gas constant, T is the temperature of the gas flowing through the leak, $\Delta p_2$ is the first pressure difference, $\Delta p_4$ is the second pressure difference, $(dp/dt)_2$ is pressure gradient of the first pressure characteristic at the second instant, and $(dp/dt)_4$ is the pressure gradient of the second pressure characteristic at the third instant, assuming that the evaporation rate is constant in the tank device, and that a leak rate is established which is proportional to the square root of the respective pressure difference.

2. The method according to claim 1, wherein ambient pressure is generated as the first pressure.

3. The method according to claim 2, wherein a negative pressure is generated as the second pressure.

4. The method according to claim 2, wherein the first pressure is produced by opening a ventilation valve of the tank device.

5. The method according to claim 2, wherein the second pressure is produced by opening a regeneration valve which establishes a connection to the intake manifold of an internal combustion engine which has a tank device.

6. The method according to claim 2, wherein the second and/or the fourth instant are chosen such that the pressure gradient determined at the time adequately describes the pressure characteristic.

7. The method according to claim 1, wherein a negative pressure is generated as the second pressure.

8. The method according to claim 7, wherein the first pressure is produced by opening a ventilation valve of the tank device.

9. The method according to claim 7, wherein the second pressure is produced by opening a regeneration valve which establishes a connection to the intake manifold of an internal combustion engine which has a tank device.

10. The method according to claim 7, wherein the second and/or the fourth instant are chosen such that the pressure gradient determined at the time adequately describes the pressure characteristic.

11. The method according to claim 1, wherein the first pressure is produced by opening a ventilation valve of the tank device.

12. The method according to claim 11, wherein the second pressure is produced by opening a regeneration valve which establishes a connection to the intake manifold of an internal combustion engine which has a tank device.

13. The method according to claim 11, wherein the second and/or the fourth instant are chosen such that the pressure gradient determined at the time adequately describes the pressure characteristic.

14. The method according to claim 1, wherein the second pressure is produced by opening a regeneration valve which establishes a connection to the intake manifold of an internal combustion engine which has a tank device.

15. The method according to claim 14, wherein the second and/or the fourth instant are chosen such that the pressure gradient determined at the time adequately describes the pressure characteristic.

16. The method according to claim 1, wherein the second and/or the fourth instant are chosen such that the pressure gradient determined at the time adequately describes the pressure characteristic.

* * * * *